United States Patent [19]

Moody et al.

[11] Patent Number: 5,041,269
[45] Date of Patent: Aug. 20, 1991

[54] RECOVERY OF ALUMINA TRIHYDRATE IN THE BAYER PROCESS

[75] Inventors: Gillian M. Moody; Christine A. Rushforth, both of West Yorkshire, England

[73] Assignee: Allied Colloids Ltd., England, England

[21] Appl. No.: 506,860

[22] Filed: Apr. 10, 1990

[30] Foreign Application Priority Data

Apr. 10, 1989 [GB] United Kingdom ............. 8907995.8

[51] Int. Cl.$^5$ .............................................. C01F 7/46
[52] U.S. Cl. ..................................... 423/127; 423/122; 210/727; 210/728; 210/730; 210/733; 210/734
[58] Field of Search ............... 210/727, 728, 730, 733, 210/734; 423/122, 127

[56] References Cited

U.S. PATENT DOCUMENTS

| 3,390,959 | 7/1968 | Sibert | 210/734 |
| 3,445,187 | 5/1969 | Sibert | 210/734 |
| 3,541,009 | 11/1970 | Arendt et al. | 210/730 |
| 3,575,868 | 4/1971 | Galvin et al. | 423/121 |
| 4,478,795 | 10/1984 | Hereda et al. | 423/121 |
| 4,608,237 | 8/1986 | Roe et al. | 423/122 |

FOREIGN PATENT DOCUMENTS 825234 10/1969 Canada .................. 423/122

Primary Examiner—Peter Hruskoci
Assistant Examiner—Krisanne Shideler
Attorney, Agent, or Firm—Ostrolenk, Faber, Gerb & Soffen

[57] ABSTRACT

In a Bayer process for production of aluminum, alumina trihydrate crystals are formed in the pregnant liquor and are flocculated using a combination of dextran and synthetic polymer, usually a homo- or copolymer of acrylic acid. The process is particularly advantageous where the liquor contains organic components such as humate and/or oxalate.

21 Claims, No Drawings

RECOVERY OF ALUMINA TRIHYDRATE IN THE BAYER PROCESS

The present invention relates to the removal of trihydrate crystals from pregnant liquor in a Bayer process by the incorporation of a flocculant.

The Bayer process for recovering alumina from bauxite is well known and comprises digesting the bauxite in an aqueous alkaline liquor that acquires a sodium aluminate content. The insoluble residue, or red mud, is separated in a primary settler and is then washed and resettled in several washing stages. Usually liquor from a later wash stage is used to wash mud from an earlier wash stage. The wash liquor from the first wash stage and from the primary settler is further purified, for instance further clarified by filtration, and then alumina trihydrate is recovered by precipitation of crystals from the "pregnant" liquor, which is a super saturated solution.

Precipitation of the alumina trihydrate is induced by the addition of seed trihydrate crystals. The precipitate settles and is then separated from the "spent" liquor and further treated. Although some of the precipitate is relatively coarse and settles quickly and is easily separated from the supernatent, for instance by filtration, the finer material tends to settle slowly and gives poor supernatant clarities, which result in product losses. Furthermore where recovery of the precipitating includes a filtration step, fine material causes filter blinding.

It is known to improve the rate of settlement as well as supernatant clarity by the use of flocculants. Flocculants which have been used include water-soluble highly anionic synthetic polymers, for instance sodium polyacrylate, as well as natural compounds such as starches and derivatives and dextrans. We have found that synthetic polymers are not effective for all liquors, indeed in some liquors the addition of a polyacrylate has no effect at all on the clarity of the spend liquor. Although dextran has been found to be a reliable flocculant, it is generally more expensive than synthetic flocculants for equivalent performance, and its performance is often inadequate.

In U.S. Pat. No. 3,085,853 the use of dextran alone as a flocculant for red mud is disclosed.

In CA-A-No. 825234 mixtures of dextran and "anionic salts" are used to flocculate aluminium trihydrate. One example of an anionic salt is sodium polystyrene sulphonate while all of the rest of the salts are small molecules such as inorganic ions or aliphatic carboxylic acid salts such as citrate and oxalate. The addition of polystyrene sulphonate to dextran appears to make the separation slower than using dextran alone.

In a new process according to the invention, alumina trihydrate crystals are formed and recovered from a Bayer process liquor by adding a flocculant to the liquor and the process is characterised in that the flocculant comprises polysaccharide and a high molecular weight water-soluble synthetic anionic flocculant polymer formed from ethylenically unsaturated monomer including acrylic monomer.

The invention is based on the surprising discovery that for pregnant liquor where synthetic anionic flocculants have little or no effect on the recovery of trihydrate, the combination of that polymer with dextran or other polysaccharide gives a significant improvement over the use of dextran alone in the final clarity of the supernatant liquor, improving the subsequent filtration rate, and also improves the rate of settlement. In addition, the invention allows use of a broader molecular weight range of dextran than was previously possible with the use of dextran alone.

It is found that the process of the invention has maximal benefits when the liquor to which the flocculant is added has a content of dissolved organic components in the range of 0.1 to 30 g/l, e.g. around 4 g/l. We have found that it is these low organic content liquors from which it is most difficult to precipitate the trihydrate crystals and in which synthetic polymers are inadequate.

The process of the invention is generally carried out with the liquor at a temperature of at least 50° C. more preferably in the range 60° to 80° C. We have found that in liquors which are subjected to high temperatures the use of conventional polyacrylate alone is inadequate, whereas the use of the flocculant according to the invention gives surprising improvements over the use of dextran alone.

The addition of the dextran/polymer flocculant is generally made after precipitation has been induced by the addition of seed trihydrate crystals. It is alternatively possible to add the flocculant combination prior to the addition of the seed crystals. The flocculant is mixed into the liquor in the normal manner. The two components may be added to the liquor simultaneously, for instance they may be added either as a blend, usually an aqueous solution of the two components, or as a solid agglomerate. Alternatively the components may be added sequentially, for instance the polymer may be added first and the dextran second or vice versa. Best results are obtained when the dextran is added prior to the polymer. Usually the components are each added as aqueous solutions. The components are generally supplied for use in the process as solids, optionally a mixture of solids where they are added as a blend, or a pre-formed agglomerate, and are first dissolved in water to form a concentrate before being added to the liquor. Intermediate dilution may be necessary.

When using the agglomerated embodiment and mixing with an aqueous medium, the agglomerate can be substantially broken down to the individual polymer particles. The agglomerate can be made by wetting dry polymer particles with an aqueous liquid which renders their surfaces sufficiently sticky to form a sticky mass. This is followed by comminution to a coarse size and drying. Alternatively, the polymer particles can be stirred with the aqueous liquid to form a sticky mass which is then comminuted, preferably after drying of the mass, although comminution can be carried out on the moist mix.

It is possible to add other components at the same time as the flocculant components, which may affect the flocculation of the trihydrate or which may form part of the solid or other composition in which one or both of the flocculant components are provided. For instance dextran compositions may contain other components resulting from their mode of production and isolation or for other reasons.

The amount of dextran that is added is usually 0.1 to 10, preferably 0.2 to 5 mg/l and more preferably 0.2 to 2 mg/l. The dextran:synthetic ratio usually used comprises 1:10 to 5:1, preferably 1:4 or 1:2 to 3:1, and more preferably 3:2 (by weight). The particular dextran:synthetic ratio selected is dependent on the properties of the liquor in which the flocculant is to be used; e.g. its solids content and the particle size of the solids; its organics content; and any other constituents dissolved in the liquor.

The amount of synthetic polymer depends, inter alia, on its anionic content and molecular weight (which is usually above 0.5 million and preferably above 1 million) but is usually in the range of 0.1 to 20, preferably 0.2 to 10, and more preferably 0.2 to 5, mg/l. Often less than 1 mg/l synthetic polymer can be used.

The alkalinity of the liquor can range from, for instance, 10 to 300 g/l, expressed as sodium hydroxide. When, as is often preferred, the dextran is used in the more caustic liquors the alkalinity typically is in the range 100 to 300, often 200 to 300, g/l expressed as sodium hydroxide.

The precipitate is usually recovered by filtration although may be subjected to settlement alone with removal of the supernatant. The trihydrate crystals that are recovered can then be treated by the usual processes, including calcination, which drives off the water and is sufficient to burn off any organic residues including the residues of the flocculant. Likewise the supernatant "spent" liquor is recycled in the conventional manner to the digestion stage.

Although this invention has been described in terms of use of dextran in combination with an anionic synthetic polymer, dextran sulphate, or alternatively other glucans or other homo- or hetero- polysaccharides, may also be useful in the process of the invention. Useful dextrans or alternative polysaccharides are water-soluble and generally have a molecular weight of at least 50,000 although values in the range 500,000 up to 40,000,000 can be preferred. Best results are achieved with molecular weights above 1 or 2 million or even above 5 million. It is preferable for the material to be a polysaccharide of D-glucose, usually having some linkages, preferably backbone linkages, other than $\alpha(1-4)$. The polysaccharide is generally a microbial polysaccharide. Dextran is a polysaccharide of D-glucose which has a backbone linkage other than $\alpha(1-4)$, predominantly $\alpha(1-6)$. Commercially available dextrans such as those produced by the fermentation of *Leuconostoc mesenteroides* or *L. dextranicum*. Suitable dextrans are also described in U.S. Pat. No. 3,085,853. Amylopectin, which has predominantly $\alpha(1-4)$ linkages between glucose units with side chains joined by $\alpha(1-6)$ linkages, can be used in place of dextran in the process.

The synthetic polymeric flocculant is a high molecular weight water-soluble polymer, and is preferably predominantly anionic in nature. Non-ionic and cationic polymers are also suitable for use in the invention, however the cationic polymers tend to be only of use on sequential addition with the dextran. The preferred anionic polymers are formed from anionic ethylenically unsaturated monomer optionally with non-ionic ethylenically unsaturated monomer. Preferably the monomers are all acrylic monomers.

The anionic monomer is generally a monoethylenically unsaturated carboxylic or sulphonic acid which is usually acrylic acid but can be, for instance, methacrylic acid or 2-acrylamido methyl propane sulphonic acid. The anionic monomer is generally present in the form of a sodium or other alkali metal or ammonium salt.

The non-ionic monomer, if present, is usually acrylamide but other non-interfering monomers may be included in known manner. For instance a minor amount of methylol acrylamide units may be included, e.g. as described in U.S. Pat. No. 3,975,496. Since the pregnant liquor is highly alkaline the content of anionic residues is preferably high.

The polymer is generally a polymer comprising 20 to 100%, usually 50 to 100% anionic monomer (usually sodium acrylate) with the balance being non-ionic (usually acrylamide). Preferably the polymer is formed from 80 to 100% anionic and most preferably is a homopolymer of anionic monomer e.g. polyacrylate. The homopolymers tend to be of use over a wider range of dextran concentrations than the copolymers, the latter tending to work better at relatively low dextran concentrations.

The polymer usually has a molecular weight in the usual range for flocculants; e.g. of at least 1 million, preferably with an intrinsic viscosity in the range 5 to 30 dl/g. It is produced by conventional polymerisation processes for instance by aqueous gel polymerisation or by reverse phase polymerisation.

The following examples illustrate the invention; in all of which an equivalent amount of sodium tripolyphosphate to dextran is added:

EXAMPLE 1

500 ml of a simulated pregnant liquor comprising a liquor containing 25 g/l alumina trihydrate and 200 g/l sodium hydroxide is maintained at a temperature of 75° C. Each sample is well mixed using a steel plunger and dosages of components as indicated in the table are added. Mixing is obtained by 10 strokes of a steel plunger. The sample is allowed to stand for 10 minutes and a sample of the supernatant is then removed and its turbidity measured in nephelometric turbidity units (NTU) using a standard turbidimeter. The results are shown in the following table.

The synthetic polymer is a homopolymer of acrylic acid in the form of its sodium salt conventionally used in floocculation of trihydrate crystals. The dextran used was presented in the form of a 50:50 (by weight) mixture of dextran sodium tripolyphosphate (STPP), so that an additive containing dextran contains the same amount by weight of STTP.

TABLE 1

| Additive | Dose mg/l | Turbidity (NTU) |
| --- | --- | --- |
| Synthetic | 0.25 | >170 |
|  | 0.5 | >170 |
|  | 1.0 | >170 |
| Dextran | 0.13 | 130 |
|  | 0.25 | 130 |
|  | 0.5 | 95 |
| Synthetic A: | 0.13:0.06 | 165 |
| Dextran | 0.25:0.13 | 98 |
|  | 0.5:0.25 | 76 |
|  | 0.06:0.09 | 147 |
|  | 0.13:0.19 | 115 |
|  | 0.25:0.38 | 64 |

The results show that the synthetic polymer alone has no effect on the clarity of the supernatant liquor at all, even in relatively high dosages. The addition of dextran does improve the clarity, especially at the dosage 0.5 mg/l. The clarity that can be achieved by dextran is improved by using a blend of dextran and synthetic polymer for additives having a higher amount of dextran than synthetic polymer and also for those having a lower amount of synthetic polymer than dextran.

EXAMPLE 2

1000 ml of a simulated pregnant liquor comprising a liquor containing 11.8 g/l alumina trihydrate solids and 183.3 g/l of alkali (quoted as $Na_2CO_3$) was maintained at 127°–153° C. As in Example 1 the dextran was presented as a 50:50 blend with STPP, and the same synthetic polymers were used. Dosages of components as indicated in Table 2 (where the "dextran" dosage is of the 50/50 mixture) were added and mixed by 6 strokes of a plunger. The samples were left to settle for 5 minutes. The suspended solids of the supernatant was measured by filtering a 100 ml aliquot through a pre-weighed No. 934 AH filter paper, washing with hot deionised water, drying the filter paper and contents at 100° C. and reweighing.

TABLE 2

| Additive | Dose Level (mg/l) | Suspended Solids (g/l) |
| --- | --- | --- |
| Untreated | — | 2.99 |
| Synthetic A | 0.5 | 4.73 |
| | 1.0 | 3.84 |
| | 2.0 | 3.27 |
| Dextran | 0.25 | 2.20 |
| | 0.5 | 1.47 |
| | 1.0 | 1.31 |
| Synthetic A: Dextran | 0.25:0.125 | 2.81 |
| | 0.5:0.25 | 2.09 |
| | 1.0:0.5 | 1.42 |
| | 0.125:0.188 | 3.16 |
| | 0.25:0.375 | 1.45 |
| | 0.50:0.75 | 1.28 |
| | 0.05:0.225 | 2.88 |
| | 0.10:0.450 | 1.79 |
| | 0.20:0.900 | 0.98 |

The examples shows that the use of a dextran:synthetic blend irrespective of the ratio of the blend, gives a lower suspended solids and therefore lower turbidity as compared to the use of an equivalent dose of dextran alone. The results indicate that a synethetic:dextran ratio of around 2:3 shows improvement over dextran alone over a wider range of dextran concentrations. In addition when the ratio of synthetic:dextran is low a higher dextran concentration is preferred.

EXAMPLE 3

250 ml of a simulated pregnant liquor comprising liquor containing 25 g/l alumina trihydrate solids and 175.3 g/l alkali (quoted as $Na_2CO_3$) is maintained at 55° C. As in example 1 the dextran is in the form of a 50:50 blend with STPP, (dosage given is of mixture) and the same synthetic polymers were used. Dosages of components indicated in Table 3 were added whilst stirring using a broad bladed spatula and stirring was continued for 5 seconds. The sample was transferred to a 250 ml measuring cylinder and allowed to settle for 10 minutes. After this time the supernatant suspended solids content was measured by filtering a 50 ml³ aliquot through a pre-weighed GF20 filter paper. This was washed with 10 g/l NaOH solution followed by deionised water. The paper and contents was dried and reweighed.

TABLE 3

| Additive | Dose (g/tonne) | Suspended Solids (g/l) |
| --- | --- | --- |
| Untreated | — | 2.04 |
| Dextran | 5 | 1.75 |
| | 10 | 1.08 |
| | 15 | 0.91 |
| Synthetic A: Dextran | 5:2.5 | 2.18 |
| | 10:5.0 | 1.66 |
| | 15:7.5 | 0.91 |
| | 2.5:3.75 | 1.60 |
| | 5.0:7.5 | 1.07 |
| | 7.5:11.25 | 0.93 |

TABLE 3-continued

| Additive | Dose (g/tonne) | Suspended Solids (g/l) |
| --- | --- | --- |
| | 1.0:4.5 | 1.50 |
| | 2.0:9.0 | 1.14 |
| | 3.0:13.5 | 0.97 |

As in Example 2, the results show that the use of synthetic with dextran produces a lower turbidity than generally obtained at the individual dose levels of dextran alone.

EXAMPLE 4

A simulated pregnant liquor comprising a liquor containing 208 g/l alumina trihydrate solids (solids content 208 g/l in spent liquor) taken in was maintained at 30° C. As in Example 1 the dextran was in the form of a 50:50 dextrans STPP blend and the same synthetic polymers were used. The components were added in the dosages shown in Table 4 and mixing achieved by 3 strokes of a plunger. Solids settlement rate was measured and suspended solids measured by filtration of a sample of supernatant which had been removed after allowing 30 minutes settlement.

TABLE 4

| Product | Dose Level (g/t) | Settlement Rate (m/hour) | Supernatant Suspended Solids (g/l) |
| --- | --- | --- | --- |
| Untreated | — | 0.2 | 1.68 |
| Dextran | 4.75 | 1.7 | 1.35 |
| | 12.0 | 2.2 | 0.70 |
| Synthetic A: Dextran | 2.375:3.56 | 2.5 | 1.02 |
| | 6.0:9.0 | 3.0 | 0.31 |

The results show that the synthetic:dextran blend to give a greater settlement rate, and lower turbidity, over the use of equivalent doses of dextran alone.

EXAMPLE 5

A simulated pregnant liquor comprising a liquor containing of alumina trihydrated solids and approximately 200 g/l alkali (quoted as $Na_2CO_3$). The form of dextran used was the same as in Example 1 (dose given as the mixture), as were the synthetic polymers used.

The components were added at a 0.025% solution (prepared in tap water) in the dosages shown in Table 5 and mixed using 4 strokes of a plunger. The samples were allowed 10 minutes to settle. 100 ml sample of supernatant were taken and filtered through a GFC filter. The results are quoted as a % reduction in solids retained on the filter as compared with the blank.

TABLE 5

| Additive | Dose (g/t) | % Reduction Over Blank |
| --- | --- | --- |
| Dextran | 1.85 | 51.2 |
| | 3.7 | 44.2 |
| | 5.55 | 58.1 |
| | 7.4 | 61.2 |
| | 9.25 | 65.0 |
| Synthetic A; Dextran | 1.39:0.925 | 45.5 |
| | 2.78:1.85 | 54.3 |
| | 4.16:2.775 | 59.3 |
| | 5.55:3.7 | 62.4 |
| | 6.94:4.625 | 61.4 |
| Synthetic A | 3.7 | 24.2 |
| | 7.4 | 12.8 |
| | 11.1 | 16.5 |
| | 14.8 | −5.7 |

TABLE 5-continued

| Additive | Dose (g/t) | % Reduction Over Blank |
|---|---|---|
| | 18.5 | 19.4 |

The results shows all synthetic:dextran samples to give an approximate 10 fold increase in settlement rate over that achieved with the equivalent doses of dextran alone.

EXAMPLE 6

Tests were carried out using the same method as in Example 1 except that STPP was not added to the dextran used.

5 samples of dextran of known molecular weight were compared with the industrial dextran evaluated in all previous examples. Standard industrial grade molecular weight is >3,000,000, from viscosity measurements.

The samples tested were as follows:

| (a) Molecular weight | 100,000–200,000 |
|---|---|
| (b) | 200,000–275,000 |
| (c) | 500,000– |
| (d) | 2,000,000 |
| (e) | 5,000,000–40,000,000 |

Three series of tests were carried out:
(i) Samples (a)–(e) were tested as 100% dextran against a standard sample which contains 50% sodium tripolyphosphate.
(ii) Sample (c)–(e) were tested as 50:50 blends with a synthetic homo-polymer of acrylic acid in the form of its sodium salt, against the standard as in (i) above.
(iii) Sample (b) compared with sample (e) both blended 50:50 with the same synthetic polymer as in (ii) above.

For series (i) and (ii) the results are quoted as an average of the results obtained from four separated dose levels and as % turbidity compared with the equivalent dose level of the standard industrial grade dextran dextran.

For series (iii) sample (b) results were calculated as a % of sample (e) results. Since the relationship between sample (e) and the standard was already established, the relationship between (b) and the standard could then be calculated.

The dose level used in this example ranged from 0.25 to 1.0 mg/l.

TABLE 6

| Additive | | % turbidity |
|---|---|---|
| a | 100% dextran | 237 |
| b | " | 208 |
| c | " | 158 |
| d | " | 108 |
| e | " | 94 |
| b | 50:50 Synthetic A: dextran | 140 |
| c | 50:50 Synthetic A: dextran | 103 |
| d | 50:50 Synthetic A: dextran | 89 |
| e | 50:50 Synthetic A: dextran | 90 |

A figure of e.g. 140% indicates that the turbidity is 140% that of the standard.

The above shows that only samples (d) and (e) i.e. dextran with molecular weight greater than 2,000,000 give the desired result if used alone. However, when blended with a synethetic it is possible to use a lower molecular weight dextran to achieve similar results, and dextrans of a molecular weight greater than 500,000 are acceptable.

Samples (a) and (b) do provide improvements over untreated samples or those treated with synthetic alone but are not as effective as the higher molecular weight procedure.

Therefore, the example illustrates that a wider molecular weight range of dextran can be used according to the present invention when dextran is blended with a synthetic polymer, rather than when used alone.

EXAMPLE 7

This example serves to show the effect of the presence of sodium tripolyphosphate compared to the presence of synthetic.

Samples (b) and (e) were used in Example 6 (i.e. dextran free of STPP). These were evaluated adding as 100% dextran, 50:50 blend with sodium tripolyphospahte and 50:50 blend with synthetic as used in the previous example.

The test method used was the same as in Example 1.

TABLE 7

| Additive | Dose (mg/l) | Turbidity (NTU) |
|---|---|---|
| e | 0.25 | 113 |
| | 0.5 | 110 |
| e:sodium tri-polyphosphate | 0.25:0.25 | 110 |
| | 0.5:0.5 | 98 |
| e:synthetic A | 0.25:0.25 | 100 |
| | 0.5:0.5 | 93 |
| b | 0.25 | 164 |
| | 0.5 | 160 |
| b:sodium tri-polyphosphate | 0.25:0.25 | 164 |
| | 0.5:0.25 | 160 |
| b:synthetic A | 0.25:0.25 | 157 |
| | 0.5:0.5 | 151 |

Blending dextran with sodium tripolyphosphate has a marginal beneficial effect for the higher molecular weight dextran but no effect on the lower molecular weight product.

Therefore, by considering the results of Example 6 the beneficial effect of blending with synthetic rather than sodium tripolyphosphate is clear.

EXAMPLE 8

The test procedure of Example 1 was carried out using the same polymers both in the form of a blend and in the form of an agglomerate to compare the effect on flocculation.

TABLE 8

| Additive | Dose (mg/l) | | Supernatant Turbidity NTU |
|---|---|---|---|
| | Dextran* | Synthetic | |
| Blend | 0.094 | 0.063 | 84 |
| | 0.188 | 0.125 | 68 |
| | 0.375 | 0.25 | 48 |
| | 0.75 | 0.5 | 38 |
| Agglomerate | 0.094 | 0.063 | 84 |
| | 0.188 | 0.125 | 75 |
| | 0.375 | 0.25 | 46 |
| | 0.75 | 0.5 | 45 |

*The dose of "dextran" is the amount of product as supplied (ie a 50/50 mixture of dextran and STPP) added.

As can be seen from the above results the two different forms in which the additives are used are very similar in flocculating ability.

EXAMPLE 9

The experiments described in Example 1 were repeated using a different batch of the same pregnant liquor to investigate the effect of sequential addition of the flocculant components. The results are shown in Table 2 in which '+' means 'followed by'. As in Example 1 the dextran was presented as a 50:50 blend with STPP, and the same synthetic polymer was used.

TABLE 9

| Additive | Dose mg/l | Turbidity NTV |
|---|---|---|
| Synthetic A | 0.5 | 135 |
| | 1.0 | 130 |
| Dextran | 0.25 | 114 |
| | 0.5 | 93 |
| Synthetic A: | 0.25:0.13 | 119 |
| Dextran blend | 0.5:0.25 | 104 |
| Synthetic A + | 0.25 + 0.13 | 130 |
| Dextran | 0.5 + 0.25 | 117 |
| Dextran + | 0.13 + 0.25 | 113 |
| Synthetic A | 0.25 + 0.5 | 100 |

The dose of "dextran" is the amount of product as supplied (i.e. a 50/50 mixture of dextran and STPP) added.

EXAMPLE 10

The test method was carried out as described in Example 9 to show the effect of increasing amounts of synthetic at constant dextran level during sequential addition of flocculant components, '+' means followed by. Again the dextran used was in the form of a 50:50 dextran:STPP blend, and the same synthetic polymers as in Example 1 were used.

TABLE 10

| Addition | Dose mg/l | Turbidity (NTU) |
|---|---|---|
| Dextran* | 1.0 | 126 |
| Dextran + | 1.0 + 0.1 | 119 |
| Synthetic A | 1.0 + 0.25 | 118 |
| | 1.0 + 0.5 | 103 |
| | 1.0 + 1.0 | 100 |

Increasing the amount of synthetic while maintaining the dextran level causes further drops in turbidity.

In Examples 11 to 14 turbidity measurements were taken on a variety of different substrates using two different additives—sodium polyacrylate and polyacrylamide. In all these examples an equivalent amount of sodium tripolyphosphate to dextran is added.
Synthetic A=100% sodium polyacrylate (Synthetic as in Example 1)
Synthetic B=100% Polyacrylamide I.V.=18

The turbidity was measured on the supernatant which was diluted 5× with water.

In the examples the dose of "dextran" is the amount of the product as supplied added (50/50 dextran/STPP mixture).

EXAMPLE 11

The substrate was a simulated liquor as in Example 1.

TABLE 11

| Additive | Dose mg/l | Turbidity NTU |
|---|---|---|
| Dextran | 0.25 | 164 |
| | 0.5 | 143 |
| Dextran: | 0.188:0.125 | 144 |
| Synthetic A | 0.375:0.25 | 134 |
| Synthetic A | 0.5 | 162 |
| | 1.0 | 161 |
| Dextran: | 0.188:0.125 | 162 |
| Synthetic B | 0.375:0.25 | 144 |
| Synthetic B | 0.5 | >170 |
| | 1.0 | >170 |

EXAMPLE 12

The substrate was a simulated liquor as in Example 1, but with 100 mg/l sodium humate added.

TABLE 12

| Additive | Dose mg/l | Turbidity NTU |
|---|---|---|
| Dextran | 0.125 | 162 |
| | 0.25 | 153 |
| | 0.375 | 151 |
| | 0.5 | 142 |
| Dextran: | 0.094:0.063 | 155 |
| Synthetic A | 0.188:0.125 | 125 |
| | 0.281:0.188 | 108 |
| | 0.375:0.25 | 102 |
| Dextran: | 0.094:0.063 | 169 |
| Synthetic B | 0.188:0.125 | 161 |
| | 0.281:0.188 | 151 |
| | 0.375:0.25 | 154 |

EXAMPLE 13

The substrate was simulated liquor as in Example 1, but with 2 g/l sodium oxalate added.

TABLE 13

| Additive | Dose mg/l | Turbidity NTU |
|---|---|---|
| Dextran | 0.25 | 161 |
| | 0.5 | 142 |
| Dextran: | 0.188.0.125 | 136 |
| Synthetic A | 0.375:0.25 | 108 |
| Dextran: | 0.188:0.125 | 161 |
| Synthetic B | 0.375:0.25 | 145 |

EXAMPLE 14

The substrate was a simulated liquor as Example 1 but humate and oxalate were added at 200 mg/l and 2 g/l respectively.

TABLE 14

| Additive | Dose mg/l | Turbidity NTU |
|---|---|---|
| Untreated | — | 174 |
| Dextran | 1.0 | 108 |
| | 2.0 | 122 |
| Dextran: | 0.375:0.25 | 111 |
| Synthetic A | 0.75:0.5 | 115 |
| Synthetic A | 2.0 | 165 |
| | 4.0 | 170 |
| Dextran: | 0.375:0.25 | 104 |
| Synthetic B | 0.75:0.5 | 103 |
| Synthetic B | 2.0 | 144 |
| | 4.0 | 166 |

The blend comprising polyacrylate showed improved flocculation over its dextran alone equivalent in each of examples 11 to 14. Polyacrylamide on its own is no use at all in the low organic system but the blend comprising polyacrylamide was suitable and even showed improvement over dextran alone, although in Example 12 this was over a limited dextran concentration range. The polyacrylate blend was superior in flocculation ability to the polyacrylamide blend in each case, except Example 14, where relatively high levels of humate and oxalate were present, in which the polyacrylamide blend worked best.

EXAMPLE 15

In this example the flocculating ability of a blend comprising dextran and an acrylate copolymer is compared with that of a dextran:acrylate homopolymer blend.

Synthetic G comprises a 50:50 sodium acrylate:acrylamide copolymer having a similar molecular weight as A.

A simulated liquor comprising a liquor containing 20% aluminium trihydrate solids in 200 g/l of NaOH is maintained at 50° C. The additives were mixed into the liquor in 500 cm³ cylinders using four strokes of a plunger. The settlement ratio of the solids was measured between two fixed points. The supernatant turbidity was also measured as described in Example 1 after allowing 10 minutes settlement. The dextran used was in the same form as in Example 1.

TABLE 15

| Additive | Dose mg/l | Settlement Rate (cm/min) | Turbidity (NTU) |
|---|---|---|---|
| Dextran* | 2.5 | 16.6 | |
| | 5 | 23.2 | 125 |
| | 7.5 | 21.2 | 112 |
| | 10 | 17.0 | 112 |
| Dextran: | 1.88:1.25 | 24.6 | 94 |
| Synthetic A | 3.75:2.50 | 26.1 | 77 |
| | 5.63:3.75 | 24.2 | 74 |
| | 7.5:5.00 | 18.9 | 63 |
| Dextran: | 1.88:1.25 | 16.2 | 170 |
| Synthetic G | 3.75:2.50 | 15.4 | 145 |
| | 5.63:3.75 | 12.2 | 114 |
| | 7.5:5.0 | 11.0 | 136 |
| Synthetic G | 5 | No mudline | >170 |
| | 10 | " | >170 |
| | 15 | " | >170 |
| | 20 | " | >170 |

*The dose of "dextran" is the amount of product as supplied (ie a 50/50 mixture of dextran and STPP) added.

The results show that synthetic G has no useful properties when used alone but in a blend with dextran is useful. The homopolymer does however give better results.

EXAMPLE 16

This example serves to show the flocculating ability of further different types of synthetic polymer blended with dextran.

The simulated liquor used and test procedure were the same as in Example 1, except the multistage addition was used.

The synthetic used were as follows (C-K formed by the same process as A and presumed to have similar molecular weights):

| Synthetic | |
|---|---|
| A | Polyacrylate |
| B | Polyacrylamide |
| C | 95:5 Sodium acrylate:acrylamide |
| D | 86:14 Sodium acrylate:acrylamide |
| E | 77:23 Sodium acrylate:acrylamide |
| F | 63:37 Sodium acrylate:acrylamide |
| G | 50:50 Sodium acrylate:acrylamide |
| H | 35:65 Sodium acrylate:acrylamide |
| I | 25:75 Sodium acrylate:acrylamide |
| J | 10:90 Sodium acrylate:acrylamide |
| K | 6:94 Sodium acrylate:acrylamide |

The dextran used was in the same form as in Example 1. Table 16 shows the residual turbidity (NTU) at each dose level (mg/l) of additive and can be compared against that achieved using an equivalent dose of dextran alone.

TABLE 16

| Dextran*:Synthetic | 0.188:0.125 | 0.375:0.25 | 0.75:0.5 | 1.5:1.0 |
|---|---|---|---|---|
| A | 170 | 142 | 136 | 130 |
| C | 175 | 148 | 147 | 147 |
| D | 174 | 157 | 152 | 150 |
| E | 176 | 154 | 146 | 144 |
| F | 176 | 150 | 142 | 143 |
| H | 177 | 158 | 153 | 148 |
| I | 179 | 161 | 155 | 151 |
| J | 178 | 159 | 156 | 149 |
| K | 179 | 163 | 157 | 153 |
| B | 178 | 158 | 158 | 149 |
| Dextran alone | 0.25 | 0.5 | 1.0 | 2.0 |
| | 172 | 153 | 143 | 136 |

*The dose of "dextran" is the amount of product as supplied (ie a 50/50 mixture of dextran and STPP) added.

The examples shows that synthetic other than polyacrylate can be of use according to the present invention, showing an improvement on the use of dextran alone at relatively low dextran concentration. Those synthetics comprising a copolymer with a sodium acrylate:acrylamide ratio of at least around 50:50 work better than dextran alone over a greater range of dextran concentration than those comprising lower ratios.

EXAMPLE 17

Example 1 was repeated but replacing dextran by amylopectin to assess the flocculation properties of amylopectin on its own.

TABLE 17

| Additive | Dose mg/l | Turbidity (NTU) |
|---|---|---|
| Amylopectin | 10 | 156 |
| | 20 | 91 |

These results indicate that amylopectin has flocculant properties, when used in fairly high dose levels. It may be of use in combination with a synthetic flocculant.

EXAMPLE 18

This example serves show the effect of the flocculant according to the invention on filtration. Again the dextran used was in the same form as in Example 1, as was the synthetic polymer.

Plant filtration was carried out by rotary vacuum filtration of tertiary (fine) hydrate thickener underflow. No flocculant was added to aid sedimentation.

This was then repeated but this time flocculant was added before the pump transferring slurry from the thickener underflow slurry tank to the bowl of the rotary vacuum filter.

The results obtained are quoted as % increase in throughput compared to that obtained without flocculant (based on m³/hr).

TABLE 18

| Product | Dose g/tonne solids | % increase in throughput |
| --- | --- | --- |
| Synthetic A: | 4.3:6.5 | 62 |
| Dextran* | 3.9:5.9 | 24.4 |
|  | 3.8:5.6 | 24.4 |
|  | 3.7:5.5 | 24.4 |
|  | 3.3:4.9 | 29.2 |

*The dose of "dextran" is the amount of product as supplied (ie a 50/50 mixture of dextran and STPP) added.

The results show that the addition of flocculant causes a % increase in throughput, and therefore efficiency of filtration at this ratio of synthetic:dextran to be independent of the dextran concentration.

What is claimed is:

1. A process for obtaining alumina trihydrate comprising steps of:
   digesting bauxite in an aqueous alkaline liquor to produce a slurry containing red mud solids and soluble aluminate in aqueous alkaline digesting liquor;
   separating the red mud solids and digesting liquor;
   washing the red mud solids to produce washed red mud solids and wash liquor;
   initiating precipitation of alumina trihydrate in the digesting liquor and optionally also the wash liquor; and
   flocculating the alumina trihydrate precipitate, wherein the flocculant comprises dextran and a water-soluble synthetic polymer formed from ethylenically unsaturated monomer including acrylic monomer.

2. A process according to claim 1 wherein the liquor comprises an organics content of from 0.1 to 30 g/l.

3. A process according to claim 1 wherein the temperature of the liquor is at least 50° C.

4. A process according to claim 1 wherein the synthetic polymer comprises at least 50% anionic monomer.

5. A process according to claim 4 in which the polymer is a homopolymer of anionic monomer.

6. A process according to claim 4 wherein the anionic monomer is selected from unsaturated carboxylic and sulphonic acids.

7. A process according to claim 6 in which the monomer is acrylic acid.

8. A process according to claim 1 wherein the synthetic polymer is polyacrylamide homopolymer.

9. A process according to claim 1 wherein the molecular weight of the synthetic polymer is at least 1,000,000.

10. A process according to claim 1 wherein the molecular weight of the dextran is in the range 50,000 to 40,000,000.

11. A process according to claim 10 wherein the molecular weight of the dextran is at least 1,000,000.

12. A process according to claim 1 wherein the amount of dextran added is in the range 0.1 to 10 mg/l.

13. A process according to claim 1 wherein the amount of synthetic polymer added is in the range 0.1 to 20 mg/l.

14. A process according to claim 1 wherein the ratio of dextran:synthetic polymer is in the range 1:10 to 5:1.

15. A process according to claim 1 wherein the flocculant comprises a blend of dextran and synthetic polymer powders.

16. A process according to claim 1 wherein the flocculant comprises an agglomerate of dextran and synthetic polymer particles.

17. A process according to claim 1 wherein the dextran and synthetic polymer are added sequentially.

18. A process according to claim 17 in which the dextran is added first.

19. A process according to claim 17 wherein the synthetic polymer is a cationic polymer.

20. A process according to claim 1 wherein the flocculant is mixed in after some alumina trihydrate has precipitated.

21. A process according to claim 1 in which the liquor is filtered after it has been subjected to the process as defined.

* * * * *